US012654940B2

(12) United States Patent
Pescini

(10) Patent No.: US 12,654,940 B2
(45) Date of Patent: Jun. 16, 2026

(54) AUTOMATIC WAREHOUSE FOR STORING LOADING UNITS

(71) Applicant: E80 Group S.p.A., Viano (IT)

(72) Inventor: Enrico Pescini, Viano (IT)

(73) Assignee: E80 GROUP S.P.A., Viano (IT)

( * ) Notice: Subject to any disclaimer, the term of this patent is extended or adjusted under 35 U.S.C. 154(b) by 1129 days.

(21) Appl. No.: 17/760,588

(22) PCT Filed: Sep. 16, 2020

(86) PCT No.: PCT/IB2020/058624
§ 371 (c)(1),
(2) Date: Mar. 15, 2022

(87) PCT Pub. No.: WO2021/053544
PCT Pub. Date: Mar. 25, 2021

(65) Prior Publication Data
US 2022/0315339 A1      Oct. 6, 2022

(30) Foreign Application Priority Data

Sep. 16, 2019    (IT) .......................... 102019000016433

(51) Int. Cl.
B65G 1/137          (2006.01)
(52) U.S. Cl.
CPC .................................. B65G 1/1375 (2013.01)
(58) Field of Classification Search
CPC ... B65G 1/1375; B65G 1/0485; B65G 1/0492
(Continued)

(56) References Cited

U.S. PATENT DOCUMENTS

| | | | |
|---|---|---|---|
| 9,725,240 B2 | 8/2017 | Salichs | |
| 2014/0277689 A1 | 9/2014 | Salichs | |
| 2017/0101264 A1 | 4/2017 | Brumm et al. | |

FOREIGN PATENT DOCUMENTS

| | | | |
|---|---|---|---|
| EP | 2452899 A1 * | 5/2012 | ............... B65G 1/04 |
| EP | 3418220 A1 | 12/2018 | |

(Continued)

OTHER PUBLICATIONS

International Search Report for PCT/IB2020/058624 dated Jan. 13, 2021 (3 pages).

*Primary Examiner* — Jacob S. Scott
*Assistant Examiner* — Michael E Butler
(74) *Attorney, Agent, or Firm* — Tutunjian & Bitetto, P.C.

(57)          ABSTRACT

An automatic warehouse for storing loading units (C), including a support structure defining a plurality of levels, superimposed on each other, each including a corridor and a plurality of lanes, which cross the corridor and which communicate with the corridor, along which the loading units (C) are stored. At least one entry/exit area for the loading units (C) is provided for, as well as at least one elevator for transporting the loading units (C) from the height of the entry/exit area up to heights corresponding to each of the levels, and vice versa. The elevator includes a movable platform provided with at least one housing for containing at least one loading unit (C), and means for loading/unloading the loading units on/from the housing. Also provided for are a plurality of vehicles, movable along the corridor and the lanes, for moving the loading units (C) within each of the levels.

17 Claims, 11 Drawing Sheets

(58) Field of Classification Search
  USPC ......................................................... 700/218
  See application file for complete search history.

(56)                 References Cited

FOREIGN PATENT DOCUMENTS

| | | |
|---|---|---|
| JP | S50 8270 A | 1/1975 |
| WO | 2011119083 A1 | 9/2011 |

* cited by examiner

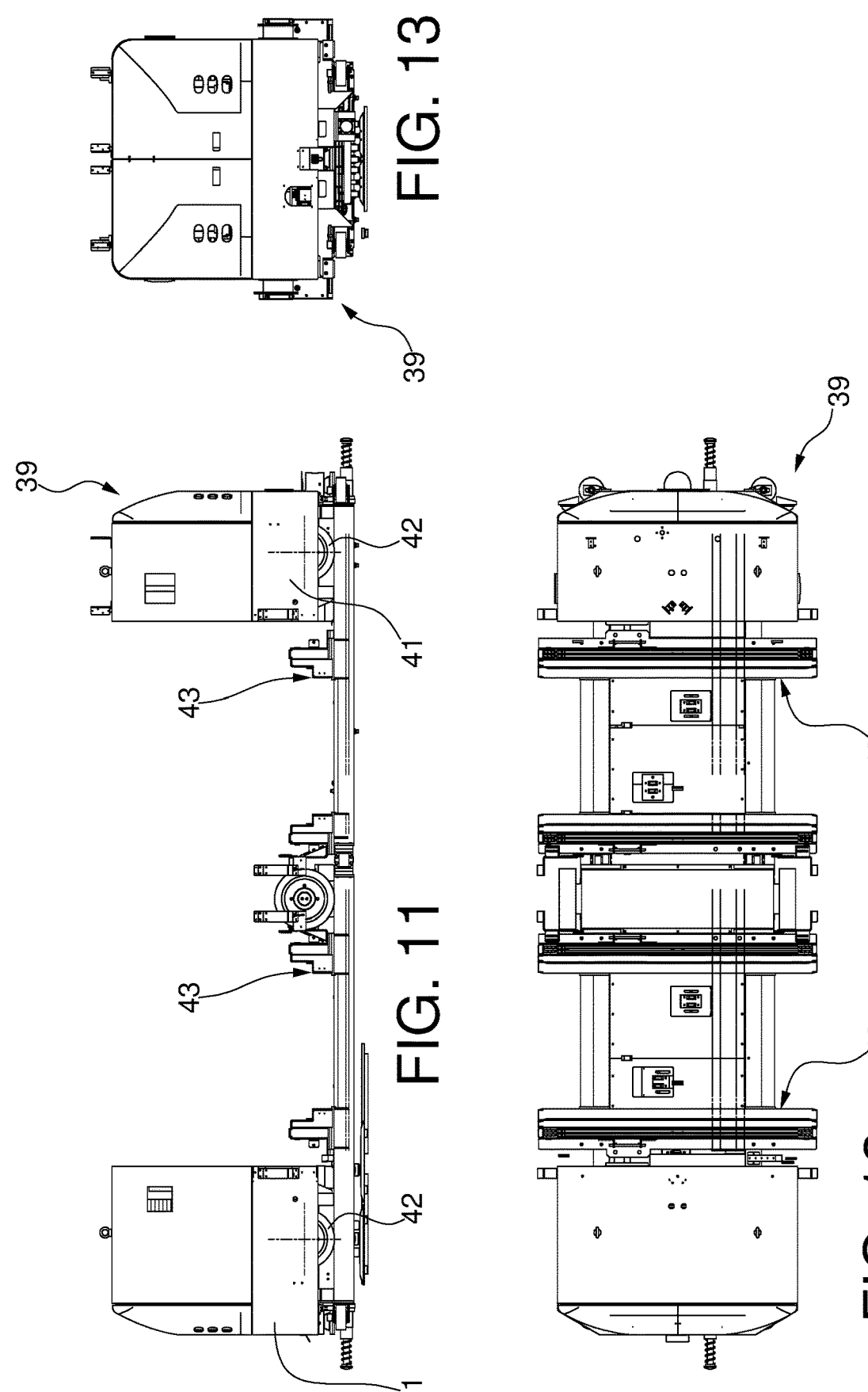

AUTOMATIC WAREHOUSE FOR STORING LOADING UNITS

TECHNICAL FIELD OF THE INVENTION

The present invention regards an automatic warehouse.

More particularly, the present invention regards a high-density automatic warehouse for storing pallets of finished products, e.g. at basic consumer goods manufacturers.

STATE OF THE PRIOR ART

In high-density warehouses, the finished products—both those intended directly for the market and those usable as auxiliary materials in production plants—are normally stored in loading units. In each of such units, the products themselves are grouped in a manner such to optimize the volumes as a function of the transport, and to ensure the necessary stability during the movements.

In the context of automatic warehouses of this type, one particular type provides that the single loading units be moved, on each level, by suitable transport vehicles, usually termed satellites and shuttles.

In particular, the satellite is a vehicle for transporting loading units which is moved within lanes defined by guide channels, provided in each level: such lanes are arranged parallel to each other according to a specific horizontal direction.

The shuttle, instead, is a transport vehicle that is moved, in each level, along horizontal corridors arranged orthogonal to the lanes of the satellites: the shuttle has the task of moving the satellites and the respective loading units.

Such types of warehouses also comprise at least one elevator, which has the task of transporting the loading units from the entry area to each of the levels, or, vice versa, from each of the levels to the exit area (which can coincide with or not coincide with the entry area).

More in detail, in order to obtain the desired flow of the loading units within the warehouses of the described type, further transport/movement devices must be used, which support the operation of the essential components listed above.

In this sense, also entry/exit conveyors are provided, which have the function of transferring the loading units from the entry area to the elevator, or from the elevator to the exit area.

The entry/exit conveyors can both carry out the aforesaid function, or these can be dedicated to a specific function (in such case, at least one entry conveyor and at least one exit conveyor are present).

The warehouse also comprises conveyors at the levels, which are instead involved with transferring the loading units from the elevator to the shuttle operating at a specific level, or from the shuttle itself to the elevator.

Also the conveyors at the levels can carry out both functions, or they can be dedicated to a specific function such case, at least one entry conveyor and at least one exit conveyor are present).

Finally, also the abovementioned elevator, which as stated transfers the loading units from the entry conveyor to the different levels, or from the different levels to the exit conveyor, can be conceived for carrying out both functions, or it can be dedicated for a specific function (in such case, at least one entry elevator and at least one exit elevator are present).

A warehouse solution of this type is described in the document U.S. Pat. No. 9,725,240.

In particular, in this solution, the possible distance existing between the elevator and the corridor, along which a specific shuttle is moved, is filled by the presence of buffer conveyors, which can comprise motorized members with belt, chain or the like, which transfer the loading units from the elevator to the shuttle and vice versa.

In the described warehouse solution, some of the main drawbacks, or at least one of the aspects that can certainly be improved, are linked to the presence of the conveyors at the levels.

The latter, which can be of different type and present in different numbers, have several characteristics that can sometimes negatively affect the optimization of the costs and spaces of the warehouse.

Indeed, first of all, the conveyors at the levels have a manufacturing, installation and implementation cost that adds considerably to the entire cost of the warehouse.

In addition, in the warehouse it is necessary to provide for the support structures for the aforesaid conveyors, and access structures for the operators in order to carry out the necessary maintenance: these structures also have their own cost which can be high. It must be added that the necessary maintenance operations to be executed on the conveyors at the levels are often difficult and costly, since they must be executed at elevation, sometimes at considerable heights.

Finally, the conveyors at the levels have a certain vertical size, which in turn negatively conditions the vertical size of the warehouse: consequently, this constitutes a limitation of the overall space available within the warehouse itself.

SUMMARY OF THE INVENTION

The task of the present invention is to improve the state of the art in the field of automatic warehouses for storing pallets of finished products.

In the context of such technical task, one object present invention is to implement an automatic warehouse which allows overcoming the previously lamented drawbacks. Another object of the present invention is to implement an automatic warehouse which allows reducing the installation and maintenance costs.

Still another object of the present invention is to provide an automatic warehouse which in particular allows eliminating the conveyors at the levels for transferring the loading units from the elevator to the shuttle, or from the shuttle itself to the elevator.

A further object of the present invention is to attain an automatic warehouse that is optimized from the size standpoint, in particular vertical size, and hence also regarding the space available for storing the products.

This task and these objects are attained by the automatic warehouse according to the present application.

The automatic warehouse comprises a support structure, defining a plurality of levels, superimposed on each other, each comprising a corridor and a plurality of lanes, which cross the corridor and which communicate with the corridor itself, along which the loading units are stored.

The warehouse also comprises at least one entry/exit area of the loading units, and at least one elevator for transporting the loading units from the height of the entry/exit area up to heights corresponding to each of the levels, and vice versa.

The elevator comprises a movable platform provided with at least one housing for containing at least one loading unit, and means for loading/unloading the loading units on/from the housing.

The warehouse also comprises a plurality of vehicles, movable along the corridor and along the lanes, for moving the loading units within each of the levels.

According to one aspect of the invention each of the corridors comprises standby areas for the loading units, provided in proximity to the elevator, for temporarily depositing the loading units before these are picked up by the elevator, in the exit flow, or before being picked up by one of the vehicles and then transferred to a specific destination lane, in the entry flow.

According to another aspect of the invention, each of the standby areas comprises two respective parallel and mirrored conformed profiles; each of such profiles defines an upper surface and a lower surface, wherein each upper surface is configured for allowing the support of the loading units, while the lower surface is configured for allowing the rolling of the wheels of the satellites.

The solution constituted by such standby areas, extremely simple and inexpensive from a structural standpoint, allows attaining the pre-established objects, since it allows carrying out the temporary deposit of the loading units intended for a specific placement at a certain level of the warehouse, or intended to be ejected from the warehouse itself.

In particular, such solution allows eliminating the need to employ costly and bulky devices which, in the known warehouses, move the loading units from the elevator to the transport vehicles within the destination level, or vice versa.

The elimination of such devices also allows clearing space, and enables the attainment of a warehouse that is structurally simpler, lighter and inexpensive, with efficient functions.

In accordance with other aspects of the present invention, methods are provided for inserting/picking up loading units in warehouses with the abovementioned characteristics.

The present application refers to preferred and advantageous embodiments of the invention.

BRIEF DESCRIPTION OF THE DRAWINGS

The characteristics of the invention will be better understood by any man skilled in the art of the field from the following description and from the enclosed drawing tables, given as a non-limiting example, in which:

FIG. 11 is a side view of one of the shuttles of the warehouse, in another embodiment of the invention;

FIG. 12 is a top view of the shuttle of FIG. 11;

FIG. 13 is a front view of the shuttle of FIG. 11;

DETAILED DESCRIPTION OF THE INVENTION

Figure 1:
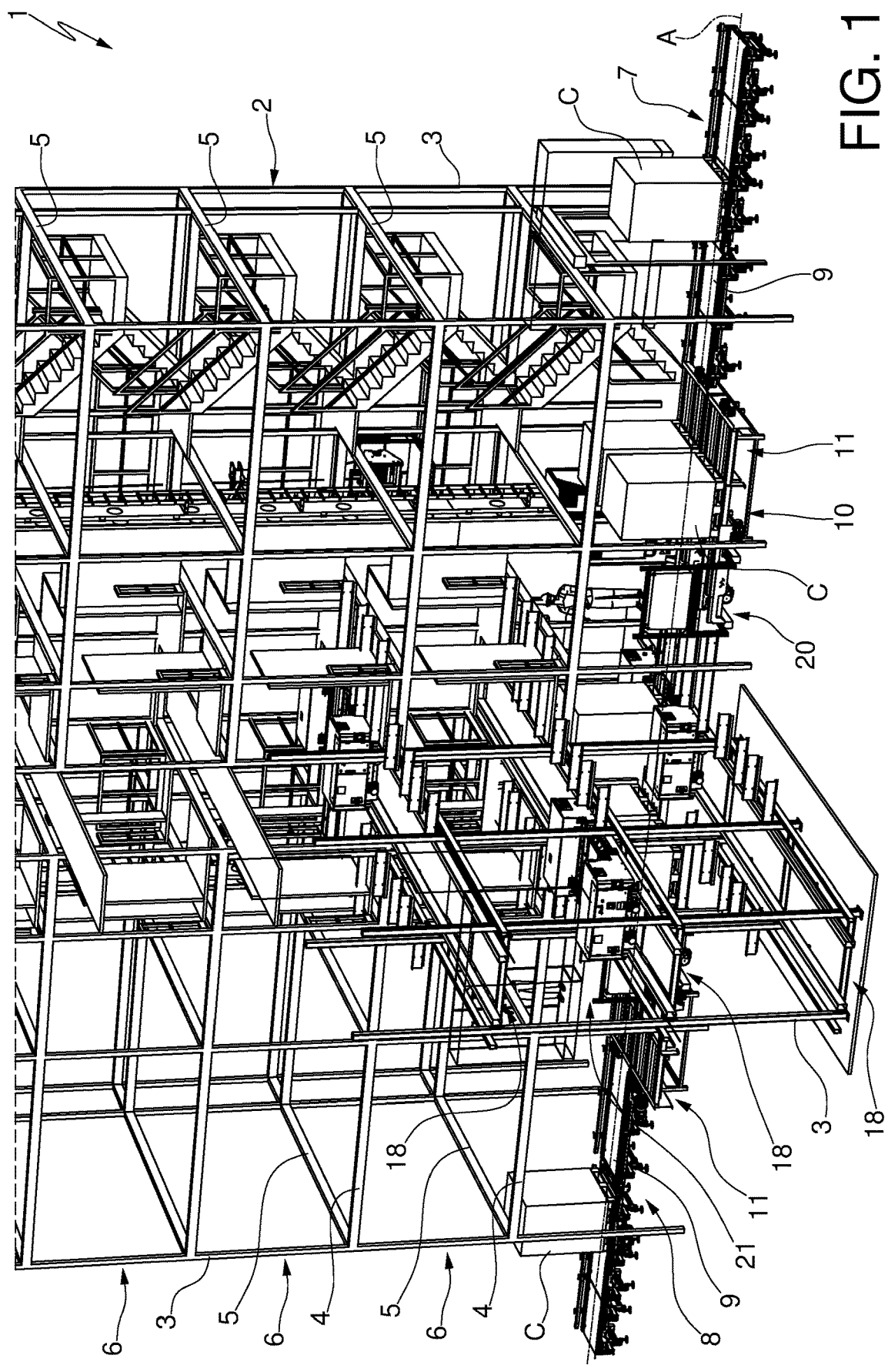
FIG. 1 is an axonometric view of a portion of the warehouse according to the invention.
Figure 2:
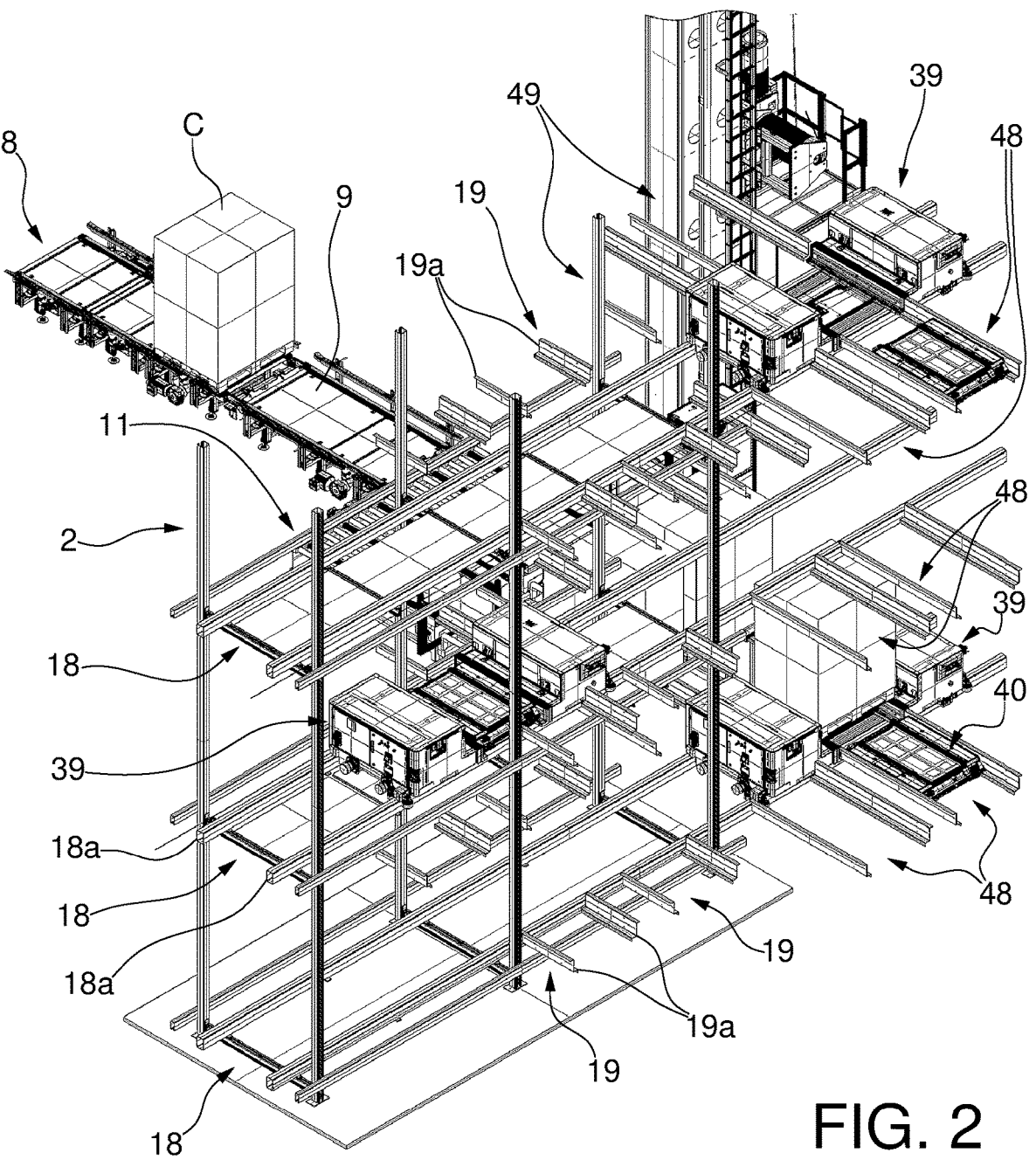
FIG. 2 is a further detailed axonometric view of the warehouse.

With reference to the enclosed FIG. 1, reference number 1 overall indicates an automatic warehouse according to the present invention.

The warehouse 1 comprises a support structure, overall indicated with 2.

The support structure 2 comprises a plurality of uprights 3, beams 4, longitudinal members 5 that are mutually associated, so as to define a plurality of levels 6, superimposed on each other.

It is specified that FIG. 1 is a detailed axonometric view which only shows a specific area of the warehouse 1; nevertheless, in such view all the main elements of the present invention are illustrated.

The warehouse 1 also comprises at least one entry/exit area 7,8 for the loading units C. It is specified that the loading units C are provided with respective support pallets P. More in detail, the warehouse 1 comprises a first entry/exit area 7, and a second entry/exit area 8.

The first entry/exit area 7 and the second entry/exit area 8 can each be indifferently used as entry area or exit area of the loading units C: in other words, the loading units C can be introduced into the warehouse 1, and picked up from the same, at the desired and most convenient area.

In the embodiment of the invention illustrated in the figures, the first entry/exit area 7 and the second entry/exit area 8 are positioned opposite each other.

This signifies that it is possible to select the side of the warehouse at which the loading units C are introduced and likewise the side from which they are picked up.

It is in any case specified that this is only one of the possible configurations according to which the entry/exit areas 7, 8 could be arranged, without limitations for the purposes of the present invention.

The first entry/exit area 7 and the second entry/exit area 8 can be provided at the height of the floor of the setting where the warehouse 1 is installed, or even at different heights with respect to the floor (and also at different heights with respect to each other).

The first entry/exit area 7 and the second entry/exit area 8 each comprise an entry/exit conveyor 9, for transporting the loading units C, one after the other, along a specific advancement direction A.

Each entry/exit area 7, 8 comprises a terminal area 10 for picking up/depositing the loading units C.

In the terminal area 10, the loading units C can arrive that must be introduced into the warehouse 1, or the loading units C can arrive that must be ejected from the warehouse 1.

In one embodiment of the invention, the loading units C reach the terminal area 10 one by one.

In another embodiment of the invention, which is of particular practical interest, the loading units C reach the terminal area 10 in pairs, in order to optimize the management thereof.

For this purpose, each entry/exit area 7, 8 also comprises a respective coupling area 11 of the loading units C: at such coupling area 11, two consecutive loading units C coming from the entry/exit conveyor 9 are positioned side-by-side each other, according to a direction orthogonal to the aforesaid advancement direction A.

Each coupling area 11 can comprise at least one movement surface 12a, 12b (e.g. of the type comprising rollers 13), for translating the loading units C in the direction orthogonal to the aforesaid advancement direction A.

Figure 3:
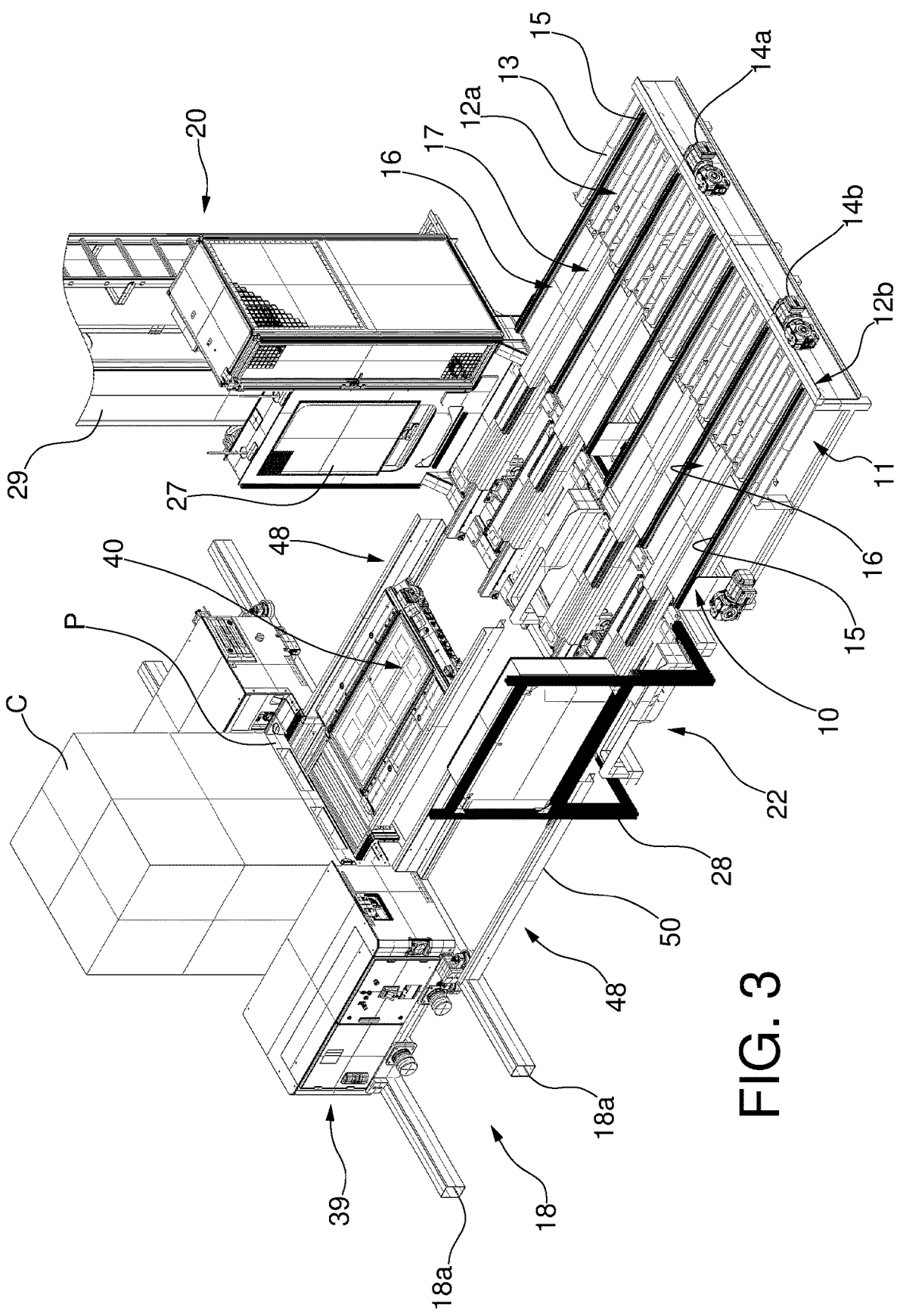
FIG. 3 is a detailed axonometric view of the first entry/exit area of the warehouse.
Figure 4:
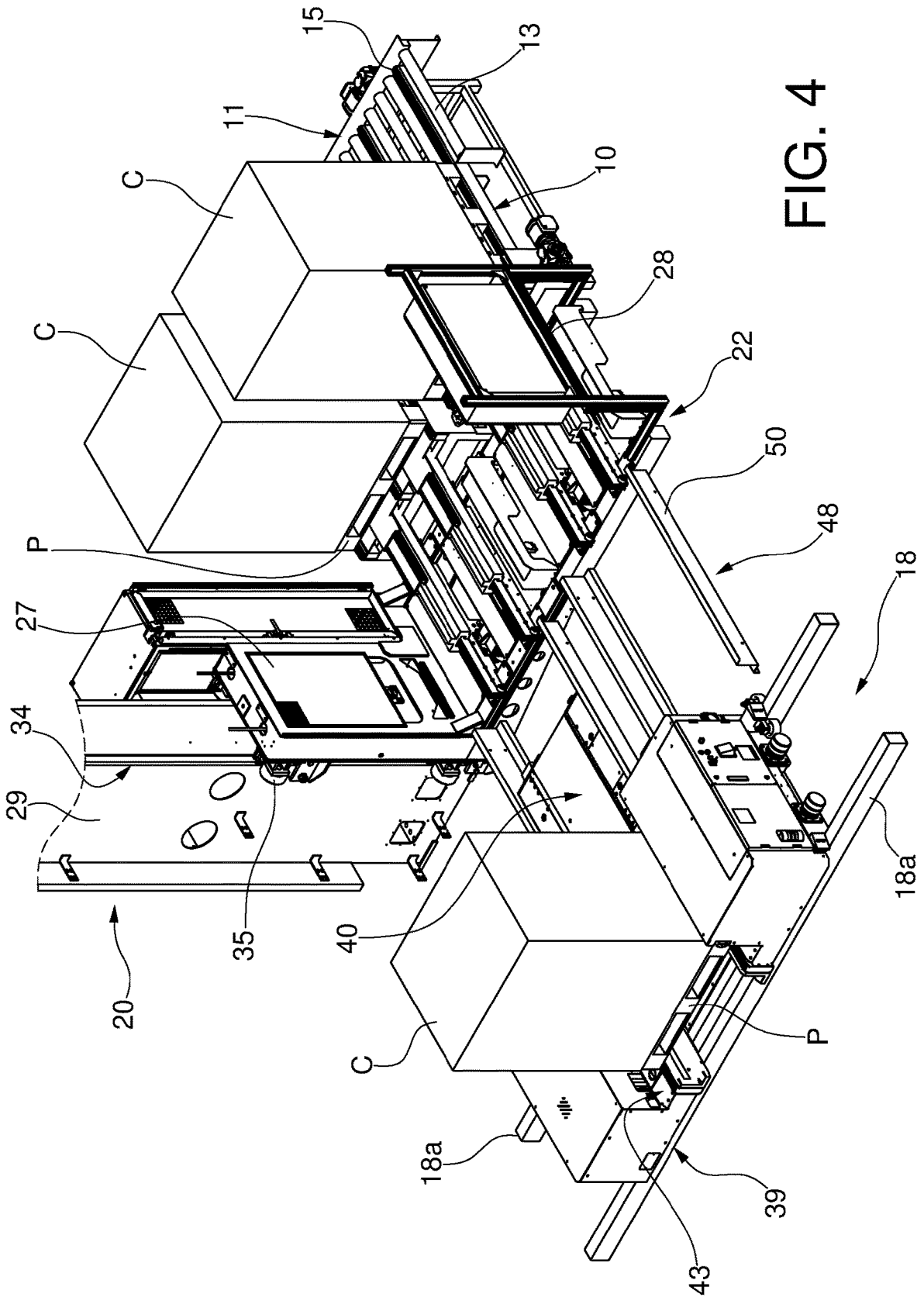
FIG. 4 is a further detailed axonometric view of the first entry/exit area of the warehouse.

Each coupling area 11 can also comprise two side-by-side movement surfaces 12a, 12b, with respective independent actuation systems 14a, 14b (FIG. 3), in a manner such that it is possible to autonomously translate the two side-by-side loading units C also according to opposite directions, such to be able to be mutually moved apart or approached.

Each entry/exit area 7, 8 also comprises means 15 for translating the loading units C from the coupling area 11 to the terminal area 10, and vice versa.

The terminal area 10 comprises a plurality of parallel support surfaces 16, distanced by various spaces 17.

Between some of these spaces 17, the aforesaid translation means 15 are inserted.

The translation means 15 can comprise members, such as belts or the like, interposed between the rollers 13 of the movement surfaces 12a, 12b, and capable to move the loading units C in a direction parallel to the axis of the rollers 13 themselves (i.e. parallel to the advancement direction A), from the coupling area 11 to the terminal area 10 or vice versa.

The support structure 2 of the warehouse 1 comprises a series of corridors 18, oriented according to a certain direction.

Preferably, but not exclusively, the corridors 18 are oriented according to a direction orthogonal to the advancement direction A.

The corridors 18 comprise respective first guides 18a, in order to allow the movement of the vehicles for moving the loading units C, as better described hereinbelow.

Each level 6 of the warehouse 1 comprises a respective corridor 18.

In addition, the support structure 2 comprises a plurality of lanes 19.

Preferably, but not exclusively, the lanes 19 are oriented parallel to the advancement direction A.

The lanes 19 comprise respective second guides 19a, in order to allow the movement of the vehicles capable to deposit or pick up the loading units C.

In each level 6 of the support structure 2, the respective corridor 18 and the lanes 19 are mutually crossed, so as to be communicating with each other, as better described hereinbelow.

More particularly, the support structure 2 comprises a series of superimposed corridors 18, one for each level 6 of the support structure 2 itself.

In each level 6, the support structure 2 comprises a plurality of lanes 19, which all intersect a same corridor 18, and which communicate with the latter.

According to one aspect of the invention, the warehouse 1 comprises at least one elevator 20, 21.

The elevator 20, 21 has the function of transporting the loading units C from the height of the entry/exit areas 7, 8 up to heights corresponding to each level 6, or vice versa. The elevator 20, 21 comprises at least one movable platform 22, and lifting means 23 associated with the aforesaid movable platform 22.

The movable platform 22 comprises at least one housing 24, 25 for containing at least one loading unit C.

Preferably, the movable platform 22 comprises a first housing 24 and a second housing 25, for housing two respective side-by-side loading units C, so as to optimize the steps of lifting or descending of the loading units C themselves.

The movable platform 22 comprises a lower portion 26 and two opposite lateral portions 27, 28—in particular a first lateral portion 27 and a second lateral portion 28—which together constitute a kind of bracket, which defines the aforesaid housings 24, 25.

The means 23 for lifting the movable platform 22 can be of any type suitable for the application.

Figure 5:
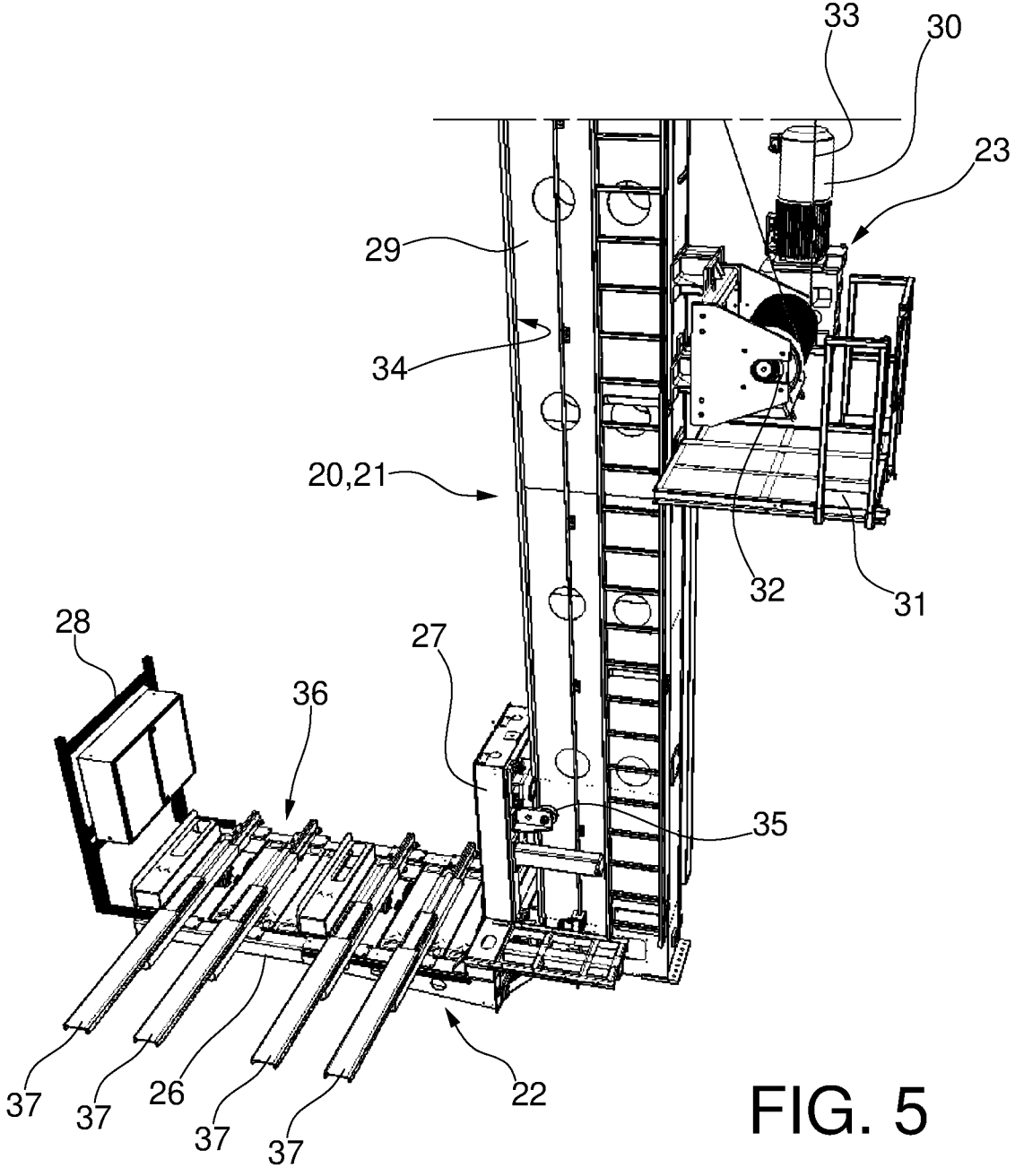
FIG. 5 is a detailed perspective view of an elevator of the warehouse.

For example, the lifting means 23 (see FIG. 5) can comprise a column element 29, which is associated with a motor 30.

The motor 30 is in turn associated with a drum 32, or other similar member, on which a cable 33 or the like is wound.

A landing 31 allows accessing the motor 30.

The cable 33 is associated with the first lateral portion 27 of the movable platform 22, so as to attain a lifting system similar to that used in elevators and lifts/hoists (also possibly provided with a counterweight movable within the column element 29).

The column element 29 externally comprises guide surfaces 34 for the first lateral portion 27 of the movable platform 22.

Correspondingly, the movable platform 22 comprises rolling members 35 along the aforesaid guide surfaces 34.

Such rolling members 35 can for example comprise wheels oriented so as to attain a sliding constraint along the guide services 34 of the column element 29.

According to one aspect of the invention, the movable platform 22 comprises means 36 for loading/unloading the loading units C on/from the housings 24, 25.

Since the movable platform 22 of the elevator 20, 21 is completely open at two opposite sides, the loading/unloading means 36 are arranged for being able to pick up/deposit loading units C at both the aforesaid sides.

The loading/unloading means 36 comprise, more particularly, telescopic forks 37 provided at each of the housings 24, 25.

Figure 6:
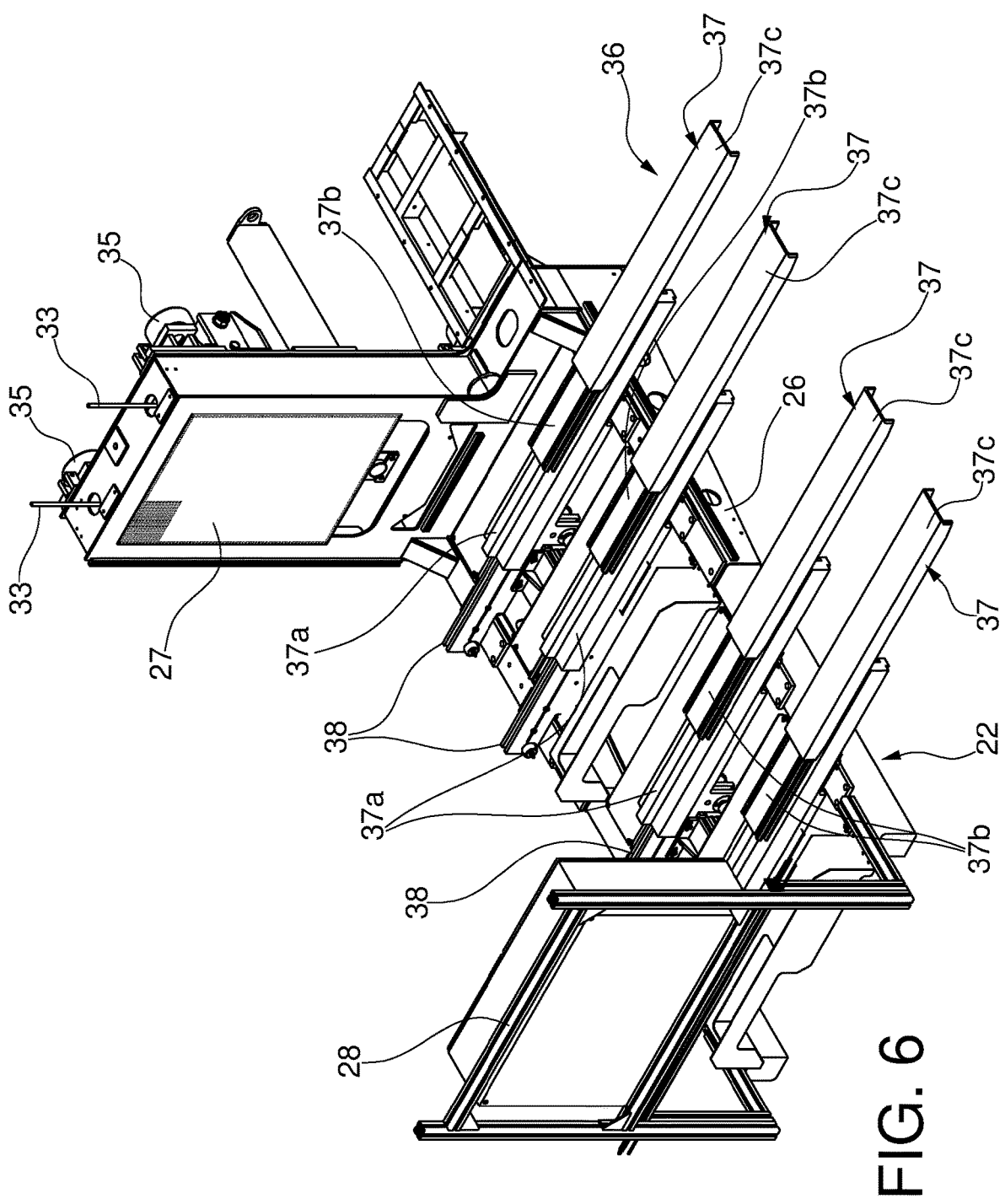
FIG. 6 is a detailed axonometric view of the movable platform of the same elevator.
Figure 7:
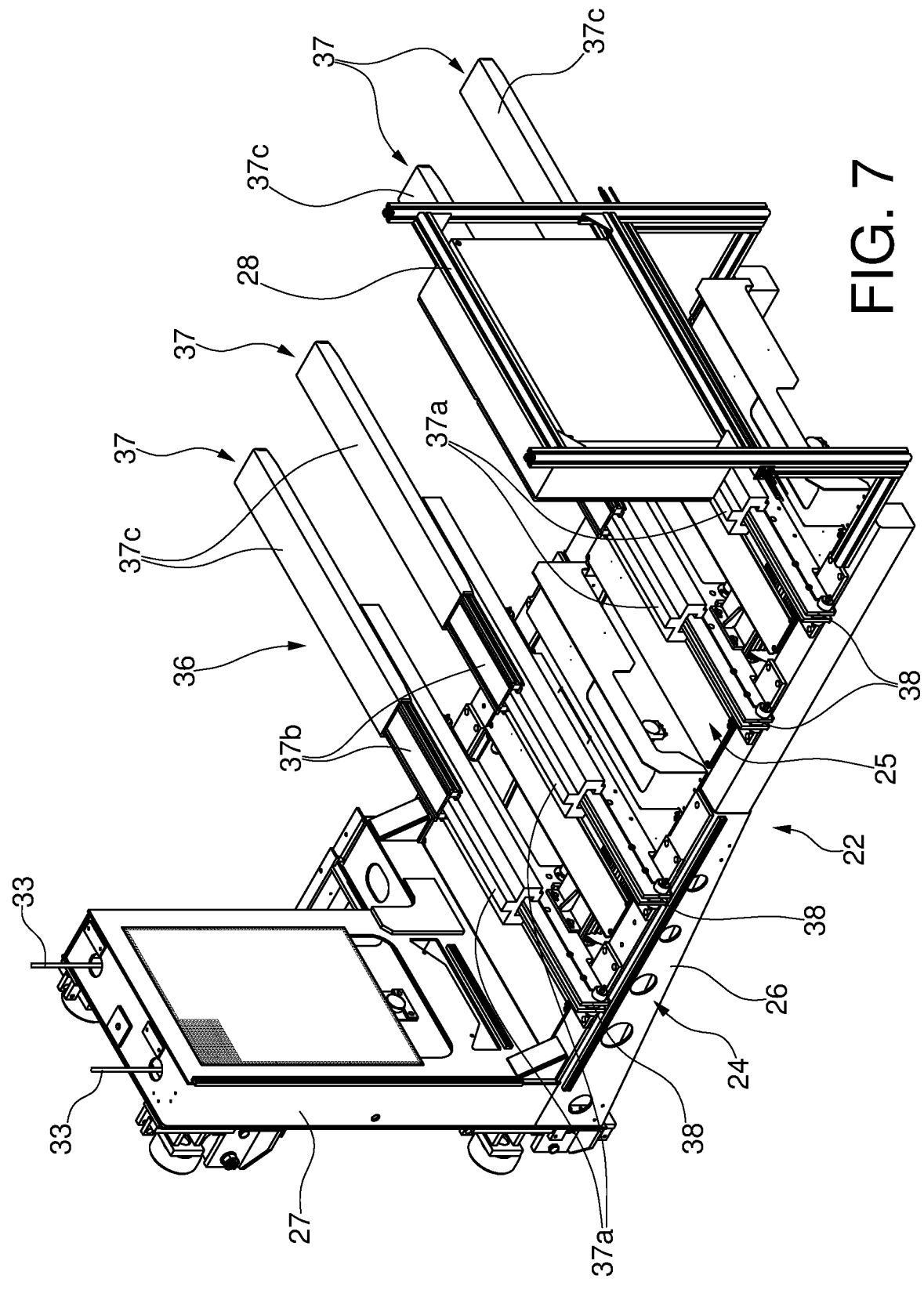
FIG. 7 is a detailed axonometric view, from different angle, of the movable platform of the same elevator.

The telescopic forks 37 are selectively movable so as to laterally project with respect to the lower portion 26 of the movable platform 22, as shown in FIGS. 6, 7.

The loading/unloading means 36 comprise, more in detail, two pairs of parallel telescopic forks 37, capable to pick up/unload respective side-by-side loading units C, together or separately.

Each of the telescopic forks 37 comprises a base 38, fixed to the lower portion 26 of the movable platform.

Each telescopic fork 37 also comprises a series of movable elements 37a, 37b, 37c (e.g. three movable elements 37a, 37b, 37c), slidably coupled to each other and to the base 38 itself.

Actuator means (not represented in the figures) are provided which allow the relative translation of the single movable elements 37a, 37b, 37c with respect to each other and with respect to the base 38.

Such actuator means can be of any type appropriate for this application.

The telescopic forks 37 can also be selectively and vertically movable with respect to the lower portion 26 of the movable platform 22.

Or the vertical translation necessary for allowing the pick-up/deposit of the loading units C by means of le telescopic forks 37 can also be obtained by means of a movement of the same movable platform 22.

Thanks to this solution, in the housings 24, 25, loading units C can be placed that coming from both sides of the movable platform 22; in the same manner, the loading units C contained in the housings 24, 25 can be unloaded from both sides of the movable platform 22.

The telescopic forks 37 can also be selectively movable horizontally, in order to possibly manage pallets with different forking openings.

In one embodiment of the invention of particular practical interest, the warehouse 1 comprises a first elevator 20 and a second elevator 21, having the characteristics described above.

As shown in FIG. 1, the first elevator 20 and the second elevator 21 are positioned, in the warehouse 1, so as to be respectively communicating with the first entry/exit area 7 and with the second entry/exit area 8.

More in detail, the first elevator 20 communicates directly with the coupling area 11 of the first entry/exit area 7, while the second elevator 21 communicates directly with the coupling area 11 of the second entry/exit area 8.

Consequently, the first elevator 20 and the second elevator 21 are situated side-by-side and aligned along the advancement direction A of the loading units C.

The first elevator 20 and the second elevator 21 are thus arranged for operating in a completely autonomous and simultaneous manner, for loading/unloading loading units C at two opposite sides of the warehouse 1.

Consequently, if in a specific operating step loading units C are introduced into the warehouse 1 in one of the entry/exit areas 7, 8, at the same time other loading units C can be picked up and ejected in the other entry/exit area 7, 8: this confers extreme versatility and efficiency to the warehouse 1.

According to another aspect of the invention, the first elevator 20 and the second elevator 21 are arranged at opposite sides of the series of corridors 18 of the warehouse 1.

This allows managing multiple loading units C simultaneously, both at the entry and exit.

More particularly, both the first elevator 20 and the second elevator 21 can be used for introducing the loading units C in the warehouse 1, or for picking up loading units C from the warehouse 1 itself.

Alternatively, while one of the elevators 20, 21 introduces loading units C in the warehouse 1, the other elevator 20, 21 can pick them up and then eject them.

According to one aspect of the invention, the warehouse 1 comprises a series of shuttles 39; each of the shuttles 39 is movable along a respective corridor 18.

Preferably, but not exclusively, one shuttle 39 is provided for each corridor 18, and thus for each level 6.

The shuttles 39 have the function of transporting the loading units C along the respective corridors 18, so as to send them to the specific lanes 19 where they will find their placement, or, in an opposite manner, so as to collect loading units C coming from the various lanes 19, which must be picked up and ejected from the warehouse 1. According to still another aspect of the invention, the warehouse 1 comprises a plurality of satellites 40; the satellites 40 are movable along directions parallel to the advancement direction A.

The satellites 40 are capable to accompany the respective loading units C in the travel within the warehouse 1, both in entering and exiting, as described hereinbelow.

In particular, as better described hereinbelow, the satellites 40 are adapted for transporting, depositing and picking up the loading units C along the lanes 19 of each of the levels 6.

Figure 8:
FIG. 8 is a detailed axonometric view of one of the standby areas of one of the levels of the support structure, together with the respective shuttle and satellite.

Each of the shuttles 39 (see for example FIG. 8) comprises a carriage 41, provided with guide means 42 along the first guides 18a of the respective corridor 18.

The body of the carriage 41 defines, substantially at the center, a seat 43 for housing a satellite 40, and a respective loading unit C.

More particularly, the seat 43 comprises two opposite sides 44 which substantially constitute, both due to size and shape and mutual positioning, an extension of the second guides 19a of the lanes 19, when the shuttle 39 is situated with its seat 43 exactly at a lane 19.

From this, it follows that a specific satellite 40 (also bearing a respective loading unit C) can be placed within the seat 43 of the shuttle 39, being stopped in such position, or it can completely traverse the shuttle 43 without being stopped, since the shape of the sides 44 allows the free movement thereof.

Figure 9:
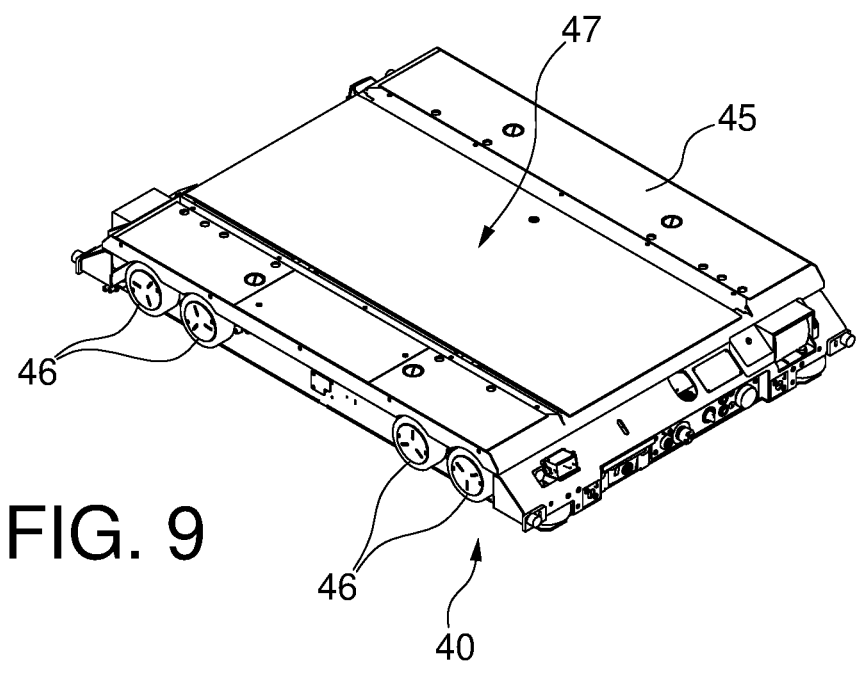
FIG. 9 is a detailed axonometric view of one of the satellites of the warehouse.

Each of the satellites 40 (FIG. 9) comprises a frame 45 which houses means for driving the lateral wheels 46; the wheels 46 are capable to allow the advancement of the satellite 40 along the second guides 19a of the lanes 19.

The frame 45 also comprises a support level 47, on which a loading unit C is designed to rest.

More particularly, the support level 47 is movable from a lower inactive position to an upper transport position of the respective loading unit C.

The transportation of the loading unit C, by the satellite 40, into a raised position has object of allowing the deposit of the loading unit C itself on the upper surfaces of the second guides 19a, for lowering the support level 47 from the upper position to the lower position.

According to a further aspect of the invention, each of the corridors 18 of the support structure 2 comprises standby areas 48, 49 for the loading units C, provided in proximity (or better in the immediate proximity) to the first elevator 20 and to the second elevator 21.

As better clarified hereinbelow, the standby areas 48, 49 constitute areas of temporary deposit of the loading units C, before these are picked up by the first elevator 20, or by the second elevator 21, or before these are picked up by a specific vehicle 39, 40 (in particular by a satellite 40) and then transferred to a certain destination lane 19.

More particularly, each corridor 18 comprises at least one first standby area 48 at the first elevator 20, and at least one second standby area 49 at the second elevator 21. Still more in detail, each corridor 18 comprises two first side-by-side standby areas 48 provided at the first elevator 20, and two second side-by-side standby areas 49 provided at the second elevator 21.

The two first standby areas 48 and the two second standby areas 49 can be selectively placed in communication with the first housing 24 and the second housing 25 of the movable platform 22.

More particularly, in each of the levels 6, each standby area 48, 49 (see in particular the detail of FIG. 8) comprises two respective parallel and mirrored conformed profiles 50: such profiles 50 in substance constitute the extensions of the second guides 19a of one of the lanes 19 of that same level 6.

Each of the profiles 50 (as with each of the second guides 19a) defines a respective upper surface 51 and a lower surface 52.

Each lower surface 52 is configured for allowing the rolling of the wheels 46 of the same side of satellite 40.

Each upper surface 51 is configured for allowing the support of the loading units C. Consequently, the loading units C can be simply placed (by the elevators 20, 21, or by the satellites 40) on the upper surfaces 51 of the profiles 50 of each standby area 48, 49, so they can then be handled in the subsequent operating step provided by the system that manages the operation of the warehouse 1.

The operation of the warehouse 1 according to the present invention is as follows.

First, the flow of the loading units C entering into the warehouse 1 is described.

The loading units C to be introduced into the warehouse 1 travel along the entry/exit conveyor 9 of the first entry/exit area 7 or of the second entry/exit area 8.

The loading units C then reach the coupling area 11, in which a pair of side-by-side loading units C is formed.

The two side-by-side loading units C are then transferred to the terminal area 10 by operating the translation means 15.

The two loading units C are then picked up by the telescopic forks 37 of the movable platform 22 of the first elevator 20, or of the second elevator 21, and deposited respectively in the first housing 24 and in the second housing 25.

The first elevator 20, or the second elevator 21, then lifts the loading units C up to reaching the destination level 6.

The telescopic forks 37 then deposit the loading units C in the first standby areas 48, or in the second standby areas 49.

In such standby areas 48, 49, the loading units C remain until one or more of the vehicles 39, 40 which operate on that specific level 6 is available to pick them up. More in detail, each of the loading units C deposited in the standby areas 48, 49 must be picked up by a satellite 40, which is capable of lifting the loading unit C from the upper surfaces 51 of the standby area 48, 49 itself.

Once the pickup of the loading unit C has been carried out, the satellite 40 can continue in its travel in various modes.

If the loading unit C must be positioned in one of the lanes 19 directly aligned with the standby areas 48, 49, the satellite 40 simply advances along the lane 19, traversing the corridor 18 and continuing until it reaches its destination.

In order to allow this, the shuttle 39 must be able to be moved, or be aligned in a suitable manner, with the standby areas 48, 49, in order to allow the movement of the satellite 40.

If, however, the loading unit C must be placed in any one of the other lanes 19 provided in the level 6, it is necessary to have the intervention of the shuttle 39, which can be moved along the corridor 18.

The shuttle 39 in fact reaches the standby area 48, 49 involved, and the satellite 40 exits from the seat 43 and picks up the loading unit C.

At this point, and in relation to different requirements, the satellite 40 can deposit the loading unit C on the sides 44 of the seat 43 of the shuttle 39; subsequently, the shuttle 39, bearing both the satellite 40 and the loading unit C, can translate along the corridor 18 in order to be directed towards another destination lane 19, and upon reaching this lane it is stopped in order to allow the exit of the satellite 40, together with the loading unit C, from the seat 43, and then it continues along a specific lane 19.

In the procedure of ejection of the loading units C from the warehouse, the operating steps described above can also be carried out in reverse order.

More particularly, a specific loading unit C can be picked up, by means of the shuttle 39, by a specific satellite 40 from the respective placement lane 19, and from here it reaches a specific standby area 48, 49. The presence of two operatively autonomous elevators 20, 21 thus allows simultaneously managing four standby areas 48, 49 in each level 6 of the warehouse 1, both regarding the entering flow and the exiting flow of the units C themselves.

In other words, the management system can select to use a specific elevator 20, 21 for the entering or exiting flow of the loading units C, if the other of the elevators 20, 21 is engaged in another operation, so as to minimize the wait times.

Also forming the object of the present invention is a method for inserting a loading unit C in the warehouse 1 having the above-described characteristics.

The method comprises, in particular, the steps of introducing at least one loading unit C in the warehouse 1 through entry/exit area 7, 8; transporting the loading unit C on an elevator 20, 21; lifting the elevator 20, 21 up to the destination level 6 of the loading unit C; placing the loading unit C in the standby area 48, 49 provided in the level 6; picking up the loading unit C by means of the shuttle 39 and a satellite 40 movable in the aforesaid level 6; conducting the shuttle 39 along the corridor 18 of the level 6 and then the satellite 40 along the placement lane 19; depositing the loading unit C in the destination position.

Also forming the object of the present invention is a method for picking up a loading unit C from the warehouse 1 having the characteristics described above.

This other version of the method comprises, in particular, the steps of picking up the loading unit C from the placement lane 19 by means of the shuttle 39 and one of the satellites 40 movable in the level 6; conducting the satellite 40 along the placement lane 19 up to the standby area 48, 49, or the satellite 40 along the placement lane 19 and the shuttle 39 along the corridor 18, up to said standby area 48, 49; placing the loading unit C in the standby area 48, 49; positioning the elevator 20, 21 at the level 6 where the loading unit C is situated; transporting the loading unit C on the elevator 20, 21; translating the elevator 20, 21 up to the height of the entry/exit area 7, 8; ejecting the loading unit C from said warehouse 1 through the entry/exit area 7, 8.

In several embodiments of the above-described methods, two loading units C can also be managed (i.e. introduced or picked up) simultaneously, in particular at the standby areas 48, 49 and on the elevators 20, 21.

The invention, as conceived, allows obtaining important technical advantages.

In addition to attaining a considerable structural simplification, the provision of the standby areas 48, 49 at each of the levels 6 of the warehouse 1 allows optimizing the times and the modes for managing the loading units C.

Indeed, this solution allows obtaining a warehouse configuration in which each corridor 18 of each level 6 is served by two elevators 20, 21 in a very limited space, which would not be possible to obtain by using the conveyors at the levels which distinguish the known solutions.

One of the performance benefits derives from the possibility to use two pairs of telescopic forks 37 in parallel in order to carry out loading/unloading cycles of two loading units C arranged side-by-side (or at a single depth), which is quicker, for example, than a load cycle of two units arranged in line on a transport means such as a chain or the like.

In consideration of the fact that each elevator 20, 21 can also transport two loading units C at a time, the benefit in terms of speed and management of the entering and exiting units C is quite evident.

Thanks to the characteristics of the invention, the automatic warehouse 1 requires a maintenance that is decidedly limited with respect to other existing solutions.

Therefore, this can be advantageous, for example, in so-called "confined" application fields, such as those of ultra-freezing or in the presence of fire protection systems with reduced oxygen.

In one embodiment of the invention, each satellite 40 of the warehouse 1 can be configured so as to support two loading units C.

Figure 10:
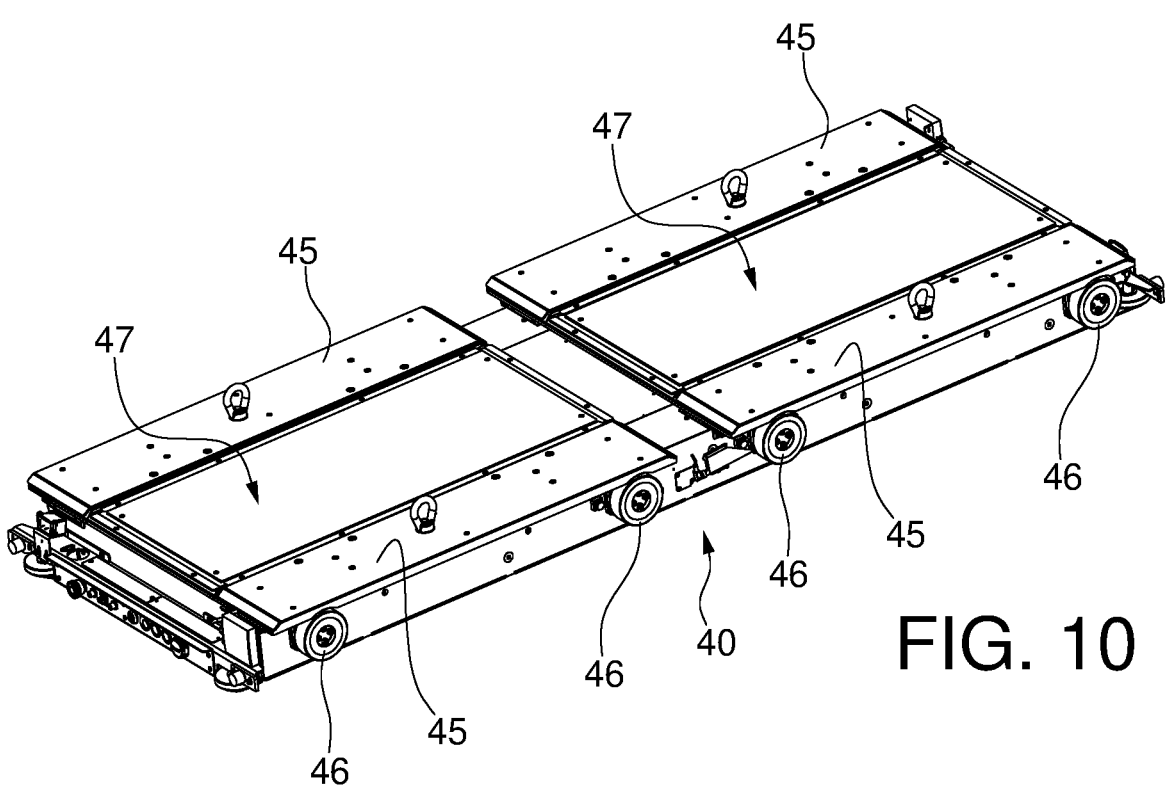
FIG. 10 is a detailed axonometric view of one of the satellites of the warehouse, in another embodiment of the invention.
Figures 14, 15, 16, 17:
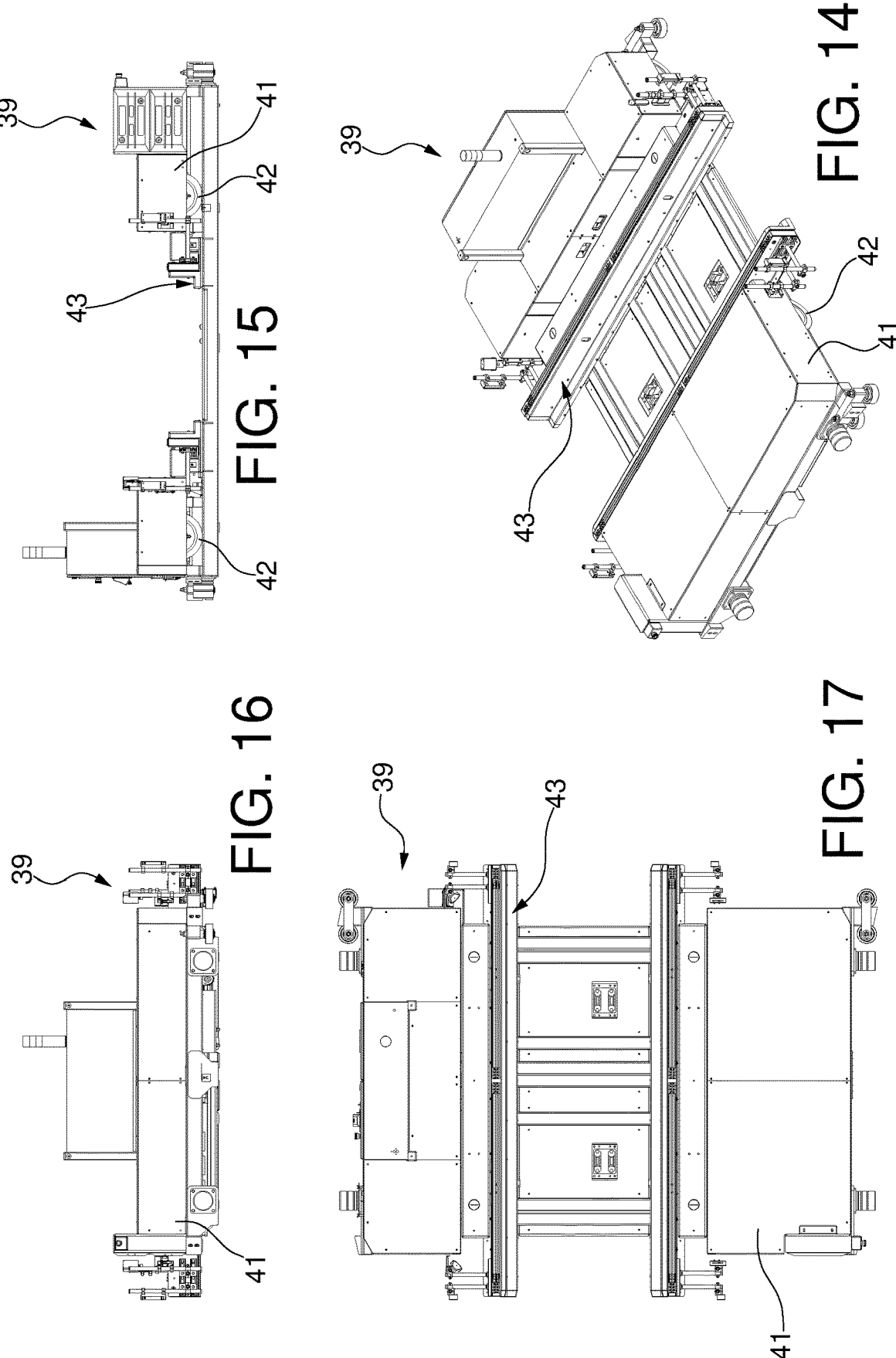
FIG. 14 is an axonometric view of one of the shuttles of the warehouse, in another embodiment of the invention.
FIG. 15 is a side view of the shuttle of FIG. 14.
FIG. 16 is a front view of the shuttle of FIG. 14.
FIG. 17 is a top view of the shuttle of FIG. 14.

In this case, as shown in FIG. 10, each satellite 40 comprises two identical support levels 47, for respective loading units C; the two support levels 47 are aligned along the longitudinal axis of the satellite 40 (i.e. the axis which, during use, is parallel to the advancement direction of the same satellite 40).

This solution is particularly advantageous with regard to the operating times for loading/unloading the units C.

In association with this type of satellite 40, in one embodiment of the invention, the warehouse 1 comprises at least one shuttle 39, or a plurality of shuttles 39, of the type illustrated in FIGS. 14-17.

Such shuttle 39 in fact comprises a seat 43 configured for housing a satellite 40 with double support level 47, like that illustrated in FIG. 10, positioned with its longitudinal axis perpendicular to that which, during use, is the advancement direction of the shuttle 39.

Due to the greater transverse size of the shuttle 39 provided in this embodiment, also the corridors 18 of the warehouse 1 must be consequently modified, i.e. widened, so to be able to allow the translation thereof.

In one embodiment of the invention, the warehouse 1 comprises at least one shuttle 39, or a plurality of shuttles 39, of the type illustrated in FIGS. 11-13.

In this embodiment, each shuttle 39 comprises two seats 43 for housing two respective satellites 40 that are each intended for transporting a single loading unit C.

The two seats 43 are aligned along the longitudinal axis of the shuttle 39 (i.e. the axis which, during use, is parallel to the advancement direction of the same shuttle 39). This shuttle 39 can be used without requiring modifications of the warehouse of FIGS. 1-9, since it has the same transverse size as the shuttle 39 with single seat 43.

The clear advantage of using this type of shuttle 39 is that it can simultaneously transport two satellites 40 with two respective loading units C, and such satellites 40, however, after having left the shuttle 39, can be autonomously directed towards respective separate destinations; alternatively, in another operating situation, the same shuttle 39 can collect two separate satellites 40 with respective loading units C, coming from different areas of a same level 6, in order to transport them simultaneously towards a standby area 48, 49.

It was thus seen that the invention attains the pre-established objects.

The present invention was described according to preferred embodiments, but equivalent variants can be conceived without departing from the protective scope offered by the following claims.

The invention claimed is:

1. An automatic warehouse for storing loading units (C), comprising:

a support structure defining a plurality of levels, superimposed on each other, each comprising a corridor and a plurality of lanes, which cross said corridor and communicate with said corridor, along which the loading units (C) are stored, at least one entry/exit area of the loading units (C), and at least one elevator for transporting the loading units (C) from the floor height up to heights corresponding to each of said levels, and vice versa, said elevator comprising a movable platform provided with at least one housing to contain at least one loading unit (C), and loading/unloading means of the loading units to/from said housing, and a plurality of vehicles, movable along said corridor and said lanes, for moving the loading units within each of said levels, wherein said vehicles comprise a plurality of satellites for transporting, depositing and picking the load units (C) along said lanes of each of said levels, each of said corridors comprises standby areas of the loading units (C), provided in proximity to said elevator, for temporarily depositing the loading units (C) before these are picked by said elevator or before being picked by one of said vehicles and then transferred to a specific destination lane, wherein each of said standby areas comprises two respective parallel and mirrored conformed profiles, wherein each one of said two profiles defines an upper surface and a lower surface, and wherein each upper surface is configured to allow the support of the loading units (C), and each lower surface is configured to allow wheels of said satellites to roll, and wherein said loading/unloading means comprise telescopic forks provided at each of said housings, selectively movable so as to laterally project with respect to the lower portion of said movable platform.

2. The automatic warehouse according to claim 1, wherein said support structure comprises a series of superimposed corridors, one for each of said levels, a first elevator and a second elevator arranged on the opposite sides of said series of corridors.

3. The automatic warehouse according to claim 2, wherein each of said corridors comprises at least a first standby area provided at said first elevator, and at least a second standby area provided at said second elevator.

4. The automatic warehouse according to claim 3, wherein each of said corridors comprises two of said first standby areas arranged side by side, provided at said first elevator, and two of said second standby areas arranged side by side, provided at said second elevator.

5. The automatic warehouse according to claim 1, wherein each of said satellites comprises a frame which houses driving means of said wheels, said frame further comprising a support level, on which a loading unit (C) is designed to rest, movable from an inactive lower position to a transport upper position of the loading unit (C), so that the lowering of said support level from said upper position to said lower position allows depositing the loading unit (C) on said upper surfaces of said profiles.

6. The automatic warehouse according to claim 1, wherein said vehicles comprise a series of shuttles for transporting the loading units (C) along respective corridors, so as to assign them to the locating lanes, or so as to collect the loading units (C) coming from said lanes.

7. The automatic warehouse according to claim 6, wherein each of said shuttles comprises a carriage defining a seat for housing the loading units (C), or the satellite.

8. The automatic warehouse according to claim 7, wherein said seat comprises two opposite shoulders which, when each of said shuttles is located with said seat at one of said lanes, constitute an extension of second guides of said lanes.

9. The automatic warehouse according to claim 1, wherein said entry/exit area comprises an entry/exit conveyor for transporting the loading units (C), one after the other, along a given advancement direction (A), and a coupling area of the loading units (C), at which two consecutive loading units (C), coming from said entry/exit conveyor, are positioned side by side to each other, according a direction orthogonal to said advancement direction (A).

10. The automatic warehouse according to claim 2, comprising a first entry/exit area and a second entry/exit area, positioned opposite to the sides of said series of corridors, communicating with said first elevator and said second elevator, respectively.

11. The automatic warehouse according to claim 1, wherein said movable platform comprises a first housing and a second housing, to accommodate two respective loading units (C) arranged side by side, said loading/unloading means comprising two pairs of parallel telescopic forks for picking/unloading respective loading units (C) arranged side by side, together or separately.

12. A method for inserting a loading unit (C) in an automatic warehouse according to claim 1, comprising the steps of:

introducing at least one loading unit (C) in said warehouse through said entry/exit area;

transporting said loading unit (C) onto said elevator;

translating the movable platform of said elevator up to the destination level of the loading unit (C);

locating the loading unit (C) in said standby area provided in said level;

picking the loading unit (C) by means of one of said vehicles movable in said level;

leading said vehicles along the locating lane, or along the corridor of said level, and then along the locating lane;

depositing the loading unit (C) in the destination position.

13. A method for picking a loading unit (C) from an automatic warehouse according to claim 1, comprising the steps of:

picking the loading unit (C) from the locating lane by means of one of said vehicles movable in said level;

leading said vehicle along said locating lane up to said standby area or along said locating lane and along said corridor up to said standby area;

locating the loading unit (C) in said standby area;

positioning said elevator at the level wherein the loading unit (C) is located;

transporting the loading unit (C) on said elevator;

translating the movable platform of said elevator up to the height of said entry/exit area;

ejecting the loading unit (C) from said warehouse through said entry/exit area.

14. The method according to claim 12, wherein said vehicles comprise a plurality of satellites for transporting, depositing and picking the loading units (C) along said lanes of each of said levels.

15. The method according to claim 12, wherein said vehicles comprise a series of shuttles for transporting the loading units (C) along respective corridors, so as to assign them to the locating lanes, or so as to collect the loading units (C) coming from said lanes.

16. The method according to claim 15, wherein each of said shuttles comprises a carriage defining a seat for housing the loading units (C), or at least one of the plurality of satellites.

17. The method according to claim 16, wherein said seat comprises two opposite shoulders which, when each of said shuttles is located with said seat at one of said lanes, constitute an extension of second guides of said lanes.

\* \* \* \* \*